(12) United States Patent
Yang et al.

(10) Patent No.: US 10,982,299 B2
(45) Date of Patent: Apr. 20, 2021

(54) METHOD FOR COMPREHENSIVELY PROCESSING NOBLE LEAD

(71) Applicants: Kunming University of Science and Technology, Kunming (CN); Kunming Dingbang Technology Co., Ltd., Kunming (CN)

(72) Inventors: Bin Yang, Kunming (CN); Dachun Liu, Kunming (CN); Wenlong Jiang, Kunming (CN); Guozheng Zha, Kunming (CN); Baoqiang Xu, Kunming (CN); Weiping Dai, Kunming (CN); Yifu Li, Kunming (CN); Qingchun Yu, Kunming (CN); Xiumin Chen, Kunming (CN); Hongwei Yang, Kunming (CN); Yang Tian, Kunming (CN); Yong Deng, Kunming (CN); Fei Wang, Kunming (CN); Heng Xiong, Kunming (CN); Jia Yang, Kunming (CN); Tao Qu, Kunming (CN); Lingxin Kong, Kunming (CN)

(73) Assignees: Kunming University of Science and Technology, Kunming (CN); Kunming Dingbang Technology Co., Ltd., Kunming (CN)

( * ) Notice: Subject to any disclaimer, the term of this patent is extended or adjusted under 35 U.S.C. 154(b) by 140 days.

(21) Appl. No.: 16/357,369

(22) Filed: Mar. 19, 2019

(65) Prior Publication Data
US 2020/0208238 A1    Jul. 2, 2020

(30) Foreign Application Priority Data
Dec. 27, 2018    (CN) .......................... 201811611103.6

(51) Int. Cl.
  C22B 3/22      (2006.01)
  C22B 13/06     (2006.01)

(52) U.S. Cl.
  CPC ................ *C22B 3/22* (2013.01); *C22B 13/06* (2013.01)

(58) Field of Classification Search
  None
  See application file for complete search history.

(56) References Cited

FOREIGN PATENT DOCUMENTS

| CN | 109055765 A | * 12/2018 |
| CN | 109055765 A | 12/2018 |
| CN | 110172578 B | 2/2020 |

OTHER PUBLICATIONS

Google Patents machine translation of CN201811611103 retrieved on Sep. 22, 2020 (Year: 2018).*

(Continued)

*Primary Examiner* — Keith D. Hendricks
*Assistant Examiner* — Joshua S Carpenter
(74) *Attorney, Agent, or Firm* — Wood Herron & Evans LLP

(57) ABSTRACT

A method for comprehensively processing noble lead provided and utilizes two instances of vacuum distillation to realize an open circuit of arsenic, lead, antimony and bismuth and the high-efficiency enrichment of precious metals of gold and silver, and can obtain elemental arsenic, a lead-bismuth-antimony alloy, a silver alloy and a copper alloy, respectively. The lead-bismuth-antimony alloy, the silver alloy and the copper alloy are processed by oxidation refining, electrorefining and chlorination refining to obtain refined lead, refined antimony, antimony trioxide, electrolytic silver and electrolytic copper, and to realize gold enrichment. The entire process has advantages of high metal direct yield, low energy consumption, short flow chart, (Continued)

simple equipment, etc., and vacuum distillation belongs to a physical process in which the alloy can be separated only by means of the difference in saturated vapor pressure between the metals, without generation of wastewater, waste gas and waste residue.

6 Claims, 1 Drawing Sheet

(56) References Cited

OTHER PUBLICATIONS

Chongjun et al. "Separation of the Metals in Precious Lead by Vacuum Distillation Process", Precious Metals, Nov. 2014, vol. 35, No. S1 (Year: 2014).*
Espacenet machine translation of CN-109055765-A retrieved on Sep. 22, 2020 (Year: 2018).*
Chongjun et al. "Separation of the Metals in Precious Lead by Vacuum Distillation Process", Precious Metals, Nov. 2014, vol. 35, No. S1 with provided USPTO translation (Year: 2014).*
Pu et al. "Study on Vacuum Metallurgy Process of Recovering Rare and Noble Metal from Lead Anode Mud", Journal of Yunnan Metallurgy, vol. 39, No. 5 (Sum. 224), Oct. 2010 with provided USPTO translation (Year: 2010).*
Chinese Patent Office, Office Action issued in corresponding CN 201811161858.0 dated Oct. 9, 2019 (5 pages), and English language translation thereof.
Chinese Patent Office, Notice of Allowance issued in corresponding CN 201811161858.0 dated Jan. 8, 2020 (1 page), and English language translation thereof.
Chongjun, B., et al., "Separation of the Metals in Precious Lead by Vacuum Distillation Process," Precious Metals, Nov. 2014, vol. 35, No. S1 (7 pages).
Zhang, J., et al., "Study on Vacuum Metallurgy Process of Recovering Rare and Noble Metal from Lead AnodeMud," Yunnan Metallurgy, Oct. 2010, vol. 39, No. 5 (5 pages).
Chinese Patent Office, Office Action issued in corresponding CN 201811161858.0 dated Oct. 9, 2019 (5 pages).
Chinese Patent Office, Notice of Allowance issued in corresponding CN 201811161858.0 dated Jan. 8, 2020 (1 page).

* cited by examiner

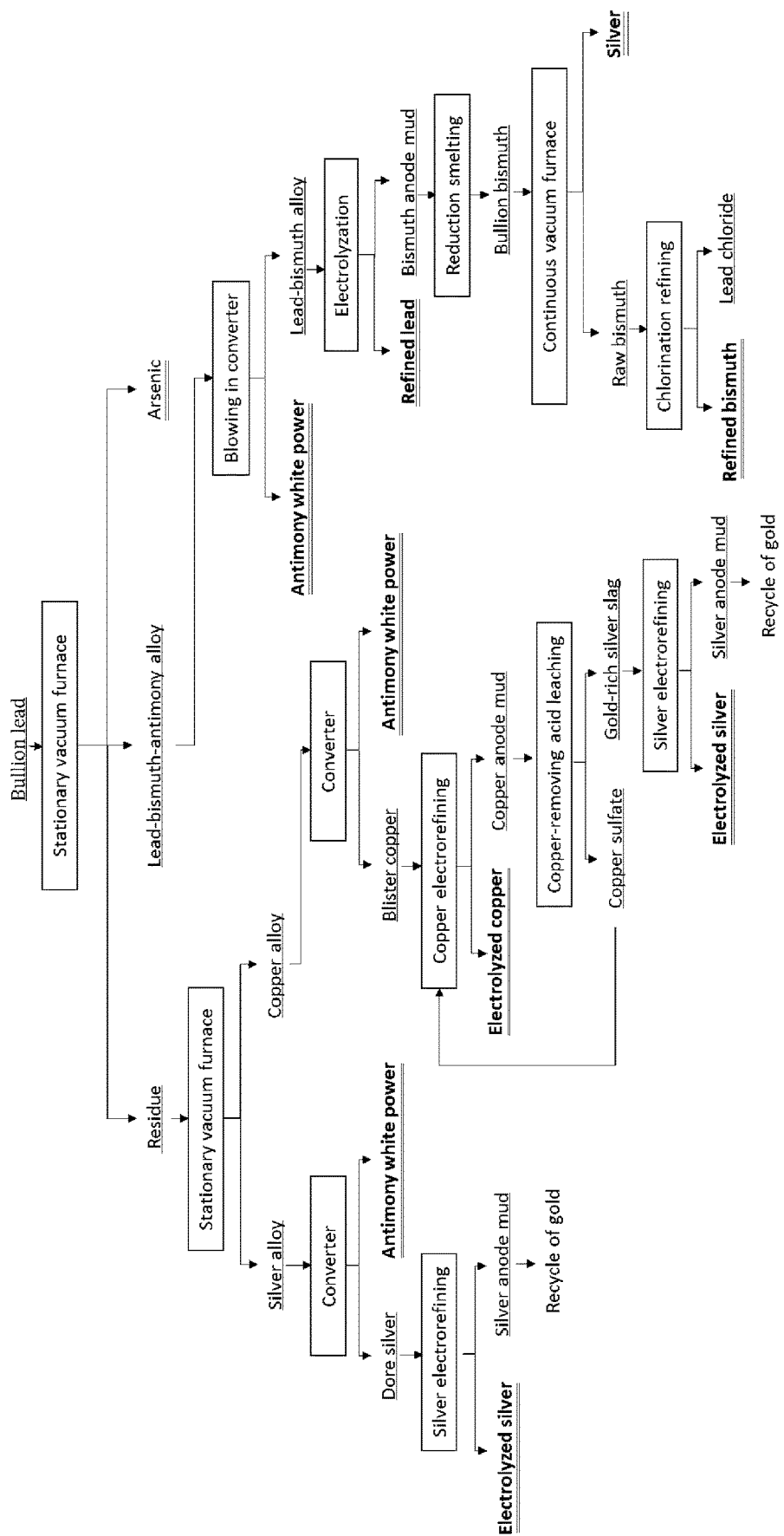

METHOD FOR COMPREHENSIVELY PROCESSING NOBLE LEAD

CROSS-REFERENCE TO RELATED APPLICATION

This application claims priority to Chinese application number 201811611103.6, filed on Dec. 27, 2018. The above-mentioned patent application is incorporated herein by reference in its entirety.

TECHNICAL FIELD

The present invention relates to solid waste recycling and reusing processes, and more particularly, relates to a method for processing noble lead contained within solid waste.

BACKGROUND

Refined lead is usually produced by a method of pyrometallurgical process+electrorefining. A large amount of lead electrolytic anode mud is produced after the electrorefining and can be processed by a method of conducting reduction smelting through a pyrometallurgical process, to obtain the noble lead. In addition to lead, the main chemical components of the noble lead also include many rare and precious metals existed in metallic and alloy phases, such as gold, silver, platinum, copper, rhodium and ruthenium. Therefore, the noble lead has a high economic value, and is the main raw material for the comprehensive recovery of the rare and precious metals in a lead smelting process.

At home and abroad, the noble lead is generally processed by using a pyrometallurgical process. The pyrometallurgical process includes pyrometallurgical smelting—pyrometallurgical refining—electrorefining, particularly including reduction smelting of the noble lead in a furnace, oxidation refining in a dore furnace, reduction smelting and refining of antimony flue dust in a reverberatory furnace, reverberatory smelting of bismuth slag, and pyrometallurgical refining of raw bismuth. The processing of the flue dust and the slag is the most critical in the pyrometallurgical process. A large amount of heavy metals and toxic substances are contained in the flue dust and the slag, may still escape into the external environment through precipitation or other manners to cause heavy-metal pollution even when a dust collection system is used for processing, and thus is a potential major safety hazard; and at the same time, the pyrometallurgical process requires conducting a reduction-oxidation process for multiple times and requires wasting of a large amount of energy sources to melt the materials, and the whole process is complicated and costly.

Due to the many defects that tend to occur in the pyrometallurgical process, a combined hydrometallurgical process has developed rapidly in recent years. A typical hydrometallurgical process consists of several basic procedures: chloric-acid leaching, separating gold by chlorination, separating silver by ammonia leaching, antimony removal by hydrolyzing, and depositing bismuth by neutralization. Although the hydrometallurgical process can avoid the pollution of the flue dust to the environment, the hydrometallurgical leaching process will generate a large amount of waste acid and wastewater to be treated, and thus also faces the problem of large environmental stress.

Therefore, it would be desirable to provide a method for comprehensively processing noble lead. The method for comprehensively processing noble lead should not generate flue dust, waste residue and a large amount of wastewater, and thus, the technical objective for such a method is to cause less pollution to the environment.

SUMMARY

To achieve the above purpose and solve the technical defects with the conventional methods as noted above, the present invention provides the following technical solution, in one embodiment. A method for comprehensively processing noble lead includes the following steps: (1) subjecting the noble lead to the first vacuum distillation to obtain a volatile matter and a residue, where the constituent elements of the noble lead includes lead, antimony, arsenic, bismuth, copper, silver and gold, subjecting the volatile matter to two-stage condensation to obtain a lead-bismuth-antimony alloy and elemental arsenic respectively; subjecting the lead-bismuth-antimony alloy to oxidation refining to obtain tantalum trioxide and a lead-bismuth alloy; then electrolyzing the lead-bismuth alloy to obtain refined lead and bismuth anode mud; then sequentially subjecting the bismuth anode mud to reduction smelting and vacuum distillation to obtain silver and raw bismuth; and finally subjecting the raw bismuth to chlorination refining to obtain refined bismuth and lead chloride; (2) subjecting the residue obtained in step (1) to the second vacuum distillation to obtain a silver alloy and a copper alloy; subjecting the silver alloy to oxidation refining to obtain antimony trioxide and dore silver; and then subjecting the dore silver to electrorefining to obtain electrolytic silver and silver anode mud; and (3) subjecting the copper alloy to oxidation refining to obtain antimony trioxide and blister copper, then subjecting the blister copper to electrorefining to obtain electrolytic copper and copper anode mud; then subjecting the copper anode mud to acid leaching to obtain a copper salt and a gold-rich silver slag; finally subjecting the gold-rich silver slag to electrorefining to obtain electrolytic silver and silver anode mud; and returning the copper salt to the electrorefining.

In one aspect, for the first vacuum distillation of step (1), the temperature is 750-950° C., the time is 2-6 hours, and the pressure is 1-100 Pa.

In another aspect, the two-stage condensation of step (1) includes first-stage condensation and second-stage condensation, the temperature for the first-stage condensation is 300-500° C.; and the temperature for the second-stage condensation is 25-250° C.

In a further aspect, in step (1) the mass content of the constituent elements of the noble lead is: 20-40% of Pb, 10-20% of Sb, 15%-40% of As, 5-10% of Bi, 5-10% of Cu, 10-15% of Ag, and 5-1500 g/t of Au.

In yet another aspect, for the oxidation refining of step (1), the temperature is 800-1200° C., the time is 6-24 hours, the oxidation atmosphere is air, the air flow is 5-20 Nm$^3$/min, and the pressure is 150-300 kPa.

In one aspect, in step (1), during the electrolyzation of the lead-bismuth alloy, the current density is 180-200 A/m$^2$, the voltage is 0.3-0.6 V, the time is 24-48 hours, the temperature is 40-55° C., and the electrolyte circulation speed is 20-30 L/min.

In another aspect, in step (1), during the reduction smelting and vacuum distillation of the bismuth anode mud, the reducing agent for the reduction smelting is anthracite, and the mass of the reducing agent is 0.5-5% by mass of the bismuth anode mud; and for the vacuum distillation, the temperature is 800-1050° C., the time is 2.5-3.5 hours, and the pressure is 1-100 Pa.

In a further aspect, for the chlorination refining in step (1), the temperature is 350-500° C., and the time is 5-6 hours; and during the chlorination refining process, the pressure of the chlorine is 0.31-0.5 kPa.

In yet another aspect, for the second vacuum distillation of step (2), the temperature is 1,100-1,500° C., the time is 2-4 hours, and the pressure is 1-100 Pa.

In some embodiments, the method further includes conducting gold extraction treatment on the silver anode mud obtained from step (2) and the silver anode mud obtained from step (3).

The method provided by the present invention utilizes two rounds of vacuum distillation to realize an open circuit of arsenic, lead, antimony and bismuth and the high-efficiency enrichment of precious metals of gold and silver, and can obtain elemental arsenic, a lead-bismuth-antimony alloy, a silver alloy and a copper alloy respectively; then the lead-bismuth-antimony alloy, the silver alloy and the copper alloy are processed by oxidation refining, electrorefining and chlorination refining to obtain refined lead, refined antimony, antimony trioxide, electrolytic silver and electrolytic copper, and to realize gold enrichment; and the entire process has advantages of high metal direct yield, low energy consumption, short flow chart, simple equipment, etc., and vacuum distillation belongs to a physical process in which the alloy can be separated only by means of the difference in saturated vapor pressure between the metals, without generation of wastewater, waste gas and waste residue, and thus it is easy to realize the industrialization, automation and continuation of the noble-lead processing. The results of use of the method provided by the present invention include: the purity of the obtained elemental arsenic is over 96%; the antimony trioxide has a purity which reaches the industrial-grade purity and thus can be directly applied; and the electrolytic silver, electrolytic copper, refined lead and refined bismuth each has a purity ≤4N can be obtained.

BRIEF DESCRIPTION OF THE DRAWING

Various additional features and advantages of the invention will become more apparent to those of ordinary skill in the art upon review of the following detailed description of one or more illustrative embodiments taken in conjunction with the accompanying drawing. The accompanying drawing, which is incorporated in and constitutes a part of this specification, illustrates one or more embodiments of the invention and, together with the general description given above and the detailed description given below, explains the one or more embodiments of the invention.

The FIGURE is a schematic flow chart of a method for comprehensively processing noble lead as provided in one embodiment of the present invention.

DETAILED DESCRIPTION

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

In one embodiment, a method for comprehensively processing noble lead is provided, including the following steps: (1) subjecting the noble lead to the first vacuum distillation to obtain a volatile matter and a residue, where the constituent elements of the noble lead include lead, antimony, arsenic, bismuth, copper, silver and gold; subjecting the volatile matter to two-stage condensation to obtain a lead-bismuth-antimony alloy and elemental arsenic respectively; subjecting the lead-bismuth-antimony alloy to oxidation refining to obtain tantalum trioxide and a lead-bismuth alloy; then electrolyzing the lead-bismuth alloy to obtain refined lead and bismuth anode mud; then sequentially subjecting the bismuth anode mud to reduction smelting and vacuum distillation to obtain silver and raw bismuth; and finally subjecting the raw bismuth to chlorination refining to obtain refined bismuth and lead chloride; (2) subjecting the residue obtained in step (1) to the second vacuum distillation to obtain a silver alloy and a copper alloy; subjecting the silver alloy to oxidation refining to obtain antimony trioxide and dore silver; and then subjecting the dore silver to electrorefining to obtain electrolytic silver and silver anode mud; and (3) subjecting the copper alloy to oxidation refining to obtain antimony trioxide and blister copper, then subjecting the blister copper to electrorefining to obtain electrolytic copper and copper anode mud; then subjecting the copper anode mud to acid leaching to obtain a copper salt and a gold-rich silver slag; finally subjecting the gold-rich silver slag to electrorefining to obtain electrolytic silver and silver anode mud; and returning the copper salt to the electrorefining.

In the present invention, the noble lead is subjected to the first vacuum distillation to obtain a volatile matter and a residue. In the present invention, the constituent elements of the noble lead include lead, antimony, arsenic, bismuth, copper, silver, and gold; and the mass content of the constituent elements of the noble lead preferably is: 20-40% of Pb, 10-20% of Sb, 15%-40% of As, 5-10% of Bi, 5-10% of Cu, 10-15% of Ag, and 5-1500 g/t of Au; where the content of Pb more preferably is 22-37%; the content of Sb more preferably is 12-17%; the content of As more preferably is 16%-35%; the content of Bi more preferably is 6-9%; the content of Cu more preferably is 6-9%; the content of Ag more preferably is 12-15%; and the content of Au more preferably is 10-1200 g/t. In an implementation of the present invention, the content of the constituent elements of the noble lead is preferably 35.14% of Pb, 14.38% of Sb, 17.21% of As, 7.60% of Bi, 7.54% of Cu, 14.93% of Ag, 18.11 g/t of Au, and the rest of inevitable impurities. The present invention has no special requirement on the source of the noble lead, and the noble lead is preferably derived from an intermediate material in a process of recovering precious metals from lead electrorefining anode mud or copper electrorefining anode mud.

In the present invention, the temperature for the first vacuum distillation is preferably 750-950° C., more preferably 760-940° C., and even more preferably 770-930° C.; the time for the first vacuum distillation is preferably 2-6 hours, more preferably 2.5-5.5 hours, and even more preferably 3-5 hours; and the pressure of the first vacuum distillation is preferably 1-100 Pa, more preferably 5-90 Pa, and even more preferably 10-80 Pa. In the present invention, the first vacuum distillation is preferably carried out by a stationary vacuum distillation furnace; and furthermore, the conditions of the first vacuum distillation are preferably achieved by the following manner: firstly placing the noble lead in the stationary vacuum distillation furnace, covering with a vacuum furnace lid for sealing, vacuum pumping to the pressure described above by a vacuum pump, heating to a desired temperature after the pressure is stabilized, and start counting to perform the first vacuum distillation.

In the present invention, the first vacuum distillation obtains a volatile matter and a residue, and the volatile matter is subjected to two-stage condensation to obtain a lead-bismuth-antimony alloy and elemental arsenic respectively. In the present invention, in the two-stage condensation, the first-stage condensation obtains the lead-bismuth-antimony alloy, and the second-stage condensation obtains the elemental arsenic; the temperature for the first-stage condensation is preferably 300-500° C., and more preferably 350-450° C.; and the temperature for the second-stage condensation is preferably 25-250° C., and more preferably 50-220° C. In the present invention, when the first vacuum distillation is carried out by using the stationary vacuum distillation furnace, the first-stage condensation corresponds to a first-stage tray, and the secondary-stage condensation corresponds to a second-stage tray.

In the present invention, when the contents are calculated by mass, the chemical composition of the lead-bismuth-antimony alloy collected from the first-stage condensation preferably includes more than 85% of Pb+Bi, 5-15% of Sb, less than 1% of As, less than 0.05% of Cu, and less than 3000 g/t of Ag; and the elemental arsenic collected from the second-stage condensation preferably includes more than 95% of As, less than 5% of Pb+Bi+Sb, less than 0.05% of Cu, and less than 0.05% of Ag; where the elemental arsenic has a arsenic content of more than 95% and thus can be directly recycled and utilized as a resource, thereby achieving open-circuit recovery of arsenic and reducing the harm of subsequent process flow.

In the present invention, the obtained lead-bismuth-antimony alloy is subjected to oxidation refining to obtain antimony trioxide (referred to as antimony white powder hereinafter) and the lead-bismuth alloy. In the present invention, for the oxidation refining, the temperature is preferably 800-1,200° C., and more preferably 850-1,150° C.; and the time is preferably 6-24 hours, and more preferably 8-20 hours. In the present invention, the oxidation atmosphere for the oxidation refining is preferably air, the air is preferably introduced by a top blowing method, and the air flow rate is preferably 5-20 $Nm^3$/min, and more preferably 8-15 $Nm^3$/min; and the pressure is preferably 150-300 kPa, and more preferably 170-280 kPa. In the present invention, when the lead-bismuth-antimony alloy is subjected to the oxidation refining, the antimony component contained in the alloy reacts with oxygen in the air to generate the antimony white powder and the balance of the lead-bismuth alloy.

In the present invention, when the contents are calculated by mass, the content of antimony trioxide in the antimony white powder is ≤99%.

In the present invention, when the contents are calculated by mass, the chemical components of the lead-bismuth alloy are: more than 75% of Pb, less than 25% of Bi, and 100-1000 g/t of Ag.

In the present invention, after the lead-bismuth alloy is obtained, the lead-bismuth alloy is electrolyzed to obtain the refined lead and the bismuth anode mud. In the present invention, the obtained lead-bismuth alloy is preferably cast into an anode plate, and then electrolyzed. The present invention has no special requirement on the dimensions of the anode plate, and dimensions well known to those skilled in the art can be used. In the present invention, during the electrolyzation of the lead-bismuth alloy, the current density is preferably 180-200 $A/m^2$, and more preferably 185-195 $A/m^2$; the voltage is preferably 0.3-0.6 V, and more preferably 0.4-0.5V; the time is preferably 24-48 hours, and more preferably 25-45 hours; the temperature is preferably 40-55° C., and more preferably 41-43° C.; the electrolyte preferably includes a fluorosilicic acid solution at a concentration of preferably 120-200 g/L, and more preferably 125-185 g/L; and during the electrolyzation, the electrolyte circulation speed is preferably 20-30 L/min, and more preferably 23-28 L/min. In the present invention, the electrolyzation is preferably carried out under the conditions to obtain refined lead having a high purity, thereby realizing an open circuit of lead.

In the present invention, the refined lead has a purity greater than or equal to 4N, and thus can be directly recycled to realize the open circuit of lead.

In the present invention, when the contents are calculated by mass, the chemical composition of the bismuth anode mud includes less than 75% of Pb, more than 25% of Bi, and less than 20 g/t of Ag.

In the present invention, after the bismuth anode mud is obtained, the bismuth anode mud is then sequentially subjected to reduction smelting and vacuum distillation to obtain silver and raw bismuth. In the present invention, the reducing agent for reduction smelting is preferably anthracite, and the mass of the reducing agent is preferably 0.5-5%, more preferably 1.0-4.5%, and still more preferably 1.5-4.0% by mass of the bismuth anode mud. The present invention has no special requirement on the temperature and time of the reduction smelting, and a temperature and time well known to those skilled in the art can be used, if the bismuth element contained in the bismuth anode mud can be completely reduced. In the present invention, the bismuth obtained from the reduction is noble bismuth. In the present invention, after the reduction, the obtained noble bismuth is subjected to vacuum distillation, and the vacuum distillation is preferably continuous vacuum distillation; the temperature is preferably 800-1,050° C., and more preferably 850-1,000° C.; the time is preferably 2.5-3.5 h, and more preferably 3 h; and the pressure is preferably 10-50 Pa, and more preferably 15-45 Pa. In the present invention, silver is separated by reduction smelting and vacuum distillation, to achieve the open circuit of silver.

In the present invention, the raw bismuth is a lead-bismuth alloy; and when the contents are calculated by mass, the chemical composition of the raw bismuth preferably includes less than 25% of Pb, more than 75% of Bi, and less than 20 g/t of Ag.

In the present invention, the purity of the silver is ≤4N.

In the present invention, after the raw bismuth is obtained, the raw bismuth is subjected to chlorination refining to obtain the refined bismuth and the lead chloride; In the present invention, during the chlorination refining process, the pressure of the chlorine gas is preferably 0.31-0.5 kPa, and more preferably 0.35-0.45 kPa; the temperature is preferably 350-500° C., more preferably 375-475° C., and still more preferably 400-450° C.; and the time is preferably 5-6 hours, more preferably 5.2-5.7 hours, and still more preferably 5.5 hours. In the present invention, the bismuth and lead are separated by chlorination refining to realize the open circuit of bismuth; lead chloride is also obtained; and the obtained lead chloride is preferably used for recycling of lead. The present invention has no special requirement on the implementation of recycling, and a manner well known to those skilled in the art can be used.

In the present invention, the purity of the refined silver is ≤4N.

In the present invention, the first vacuum distillation also obtains a residue. When the contents are calculated by mass, the chemical composition of the residue of the present invention includes: less than or equal to 0.01% of Pb+Bi, 25-35% of Sb, less than 0.08% of As, 20-30% of Cu, and 35-45% of Ag.

In the present invention, the residue is subjected to a second vacuum distillation to obtain a silver alloy and a copper alloy. In the present invention, for the second vacuum distillation, the temperature is preferably 1,100-1,500° C., more preferably 1,150-1,450° C., and even more preferably 1,200-1,400° C.; the time is preferably 2-4 hours, more preferably 2.5-3.5 hours, and even more preferably 3 hours; and the pressure is preferably 1-100 Pa, more preferably 5-95 Pa, and even more preferably 10-90 Pa. During the second vacuum distillation process of the present invention, the silver alloy is preferably collected by condensation.

In the present invention, when the contents are calculated by mass, the chemical composition of the silver alloy preferably includes 50-75% of Ag, 25-50% of Sb, less than 0.3% of Cu, less than 0.2% of As, and less than 0.16% of Pb+Bi.

In the present invention, the obtained silver alloy is subjected to oxidation refining to obtain antimony white powder and dore silver. In the present invention, for the oxidation refining, the temperature is preferably 800-1,100° C., and more preferably 850-1,050° C.; and the time is preferably 6-24 hours, and more preferably 8-20 hours. In the present invention, the oxidation atmosphere for the oxidation refining is preferably air, the air is preferably introduced by a top blowing method, and the air flow rate is preferably 5-20 $Nm^3$/min, and more preferably 8-15 $Nm^3$/min; and the pressure is preferably 150-300 kPa, and more preferably 170-280 kPa. In the present invention, when the silver alloy is subjected to the oxidation refining, the antimony element contained in the alloy reacts with oxygen in the air to generate the antimony white powder (antimony trioxide), thereby realizing the open circuit of antimony and the balance of the dore silver.

In the present invention, the mass content of the antimony trioxide in the antimony white powder is preferably ≤99%.

In the present invention, based on the mass content of 100%, the chemical composition of the dore silver preferably includes more than 96% of Ag, less than 1% of Sb, less than 0.5% of Cu, and less than 0.2% of Pb+Bi.

In the present invention, after the dore silver is obtained, the dore silver is subjected to electrorefining to obtain electrolytic silver and silver anode mud. In the present invention, the obtained dore silver is preferably cast into an anode plate, and then electrolyzed. In the present invention, during the electrolyzation of the dore silver, the distance between the cathode and the anode is preferably 50-100 mm, and more preferably 60-90 mm; the current density across the cathode and the anode is preferably 280-320 A/$m^2$, and more preferably 290-310 A/$m^2$; the cell voltage is preferably 1.8-2.5 V, and more preferably 2.0-2.2 V; the time is preferably 24-48 hours, and more preferably 25-45 hours; the temperature is preferably 30-50° C., and more preferably 35-45° C.; and the electrolyte preferably includes a nitric acid solution at a concentration of preferably 0.05-0.2 mol/L, and more preferably 0.08-0.18 mol/L.

In the present invention, the purity of the electrolytic silver is preferably ≤4N, and thus the electrolytic silver can be directly recycled due to its high purity.

In the present invention, after the silver anode mud is obtained, the silver anode mud is subjected to gold extraction treatment to recover the precious metal gold. The present invention has no special requirement on the manner of gold extraction treatment, and a manner well known to those skilled in the art can be used.

In the present invention, the second vacuum distillation also obtains a copper alloy which is remained as a residue in the distillation apparatus. In the present invention, the obtained copper alloy is subjected to oxidation refining to obtain antimony white powder and blister copper. In the present invention, for the oxidation refining, the temperature is preferably 1,100-1,300° C., and more preferably 11,50-1,250° C.; and the time is preferably 6-24 hours, and more preferably 8-20 hours. In the present invention, the oxidation atmosphere for the oxidation refining is preferably air, the air is preferably introduced by a top blowing method, and the air flow rate is preferably 5-20 $Nm^3$/min, and more preferably 8-15 $Nm^3$/min; and the pressure is preferably 150-300 kPa, and more preferably 170-280 kPa. In the present invention, when the copper alloy is subjected to the oxidation refining, the antimony element contained in the alloy reacts with oxygen in the air to generate the antimony white powder and the balance of the blister copper.

In the present invention, the mass content of the antimony trioxide in the antimony white powder is ≤99%.

In the present invention, based on the mass content of 100%, the chemical composition of the blister copper preferably includes more than 97% of Cu, less than 1% of Sb, less than 1.5% of Ag, less than 0.2% of Pb+Bi, less than 0.5% of As, and 50-15,000 g/t of Au.

In the present invention, after the blister copper is obtained, the blister copper is subjected to electrorefining to obtain electrolytic copper and copper anode mud. In the present invention, the obtained blister copper is preferably cast into an anode plate, and then electrolyzed. In the present invention, during the electrolyzation of the blister copper, the distance between the positive electrode and the negative electrode is preferably 5-110 mm, and more preferably 10-100 mm; the current density across the positive electrode and the negative electrode is preferably 220-300 A/$m^2$, and more preferably 225-295 A/$m^2$; the voltage is preferably 0.2-0.4 V, and more preferably 0.2-0.3 V; the time is preferably 1-6 hours, and more preferably 2-5 hours; the temperature is preferably 58-65° C., and more preferably 60-63° C.; the electrolyte is preferably an aqueous solution including sulfuric acid and copper sulfate, where the concentration of sulfuric acid is preferably 150-240 g/L, and more preferably 170-220 g/L, and still more preferably 180-200 g/L; and the concentration of copper sulfate is preferably 45-48 g/L, and more preferably 46-47 g/L based on copper ions.

In the present invention, the electrolytic copper has a purity preferably ≤4N, and thus can be directly recycled to realize the open circuit of copper.

In the present invention, by mass percent, the chemical composition of the copper anode mud preferably includes 90-92% of Ag, 8-8.5% of Cu, and the balance of residual Sb, Pb, Bi, As, and Au.

In the present invention, after the copper anode mud is obtained, the copper anode mud is subjected to acid leaching to obtain a copper salt and a gold-rich silver slag. In the present invention, the acid leaching reagent preferably includes concentrated sulfuric acid at a mass concentration of preferably 80-120 g/L, and more preferably 90-100 g/L; the temperature for the acid leaching is preferably 70-85° C., and more preferably 75-80° C.; and during the acid leaching, the liquid-solid ratio of the concentrated sulfuric acid to the copper anode mud is preferably 5-10 g:1 g, and more preferably 6-8 g:1 g. In the present invention, copper is removed from the copper anode mud by acid leaching to generate a soluble copper salt, and the balance of the gold-rich silver slag.

In the present invention, after the gold-rich silver slag is obtained, the gold-rich silver slag is subjected to electrorefining to obtain electrolytic silver and silver anode mud. In the present invention, the obtained dore silver is preferably cast into an anode plate, and then electrolyzed. In the present invention, during the electrolyzation of the dore silver, the distance between the cathode and the anode is preferably 50-100 mm, and more preferably 60-90 mm; the current density across the cathode and the anode is preferably 280-320 A/$m^2$, and more preferably 290-310 A/$m^2$; the cell voltage is preferably 1.8-2.5 V, and more preferably 2.0-2.2 V; the time is preferably 24-48 hours, and more preferably 25-45 hours; the temperature is preferably 30-50° C., and more preferably 35-45° C.; and the electrolyte preferably includes a nitric acid solution at a concentration of preferably 0.05-0.2 mol/L, and more preferably 0.08-0.18 mol/L.

In the present invention, the electrolytic silver obtained from the electrolyzation has a purity ≤4N, and thus can be directly recycled and utilized as a resource, thereby realizing the open circuit of silver.

In the present invention, after the silver anode mud is obtained, the silver anode mud is subjected to gold extraction treatment to recover the precious metal gold. The present invention has no special requirement on the manner of gold extraction treatment, and a manner well known to those skilled in the art can be used. In the present invention, the silver anode muds obtained from different steps are preferably mixed and then subjected to gold extraction treatment.

In the present invention, the copper sulfate obtained by the acid leaching is returned to the blister-copper electrorefining step for recycling.

In the embodiments, the present invention has no special requirement on the device used in each step, unless otherwise specified, and a device well known to those skilled in the art may be employed.

In the present invention, after a recyclable product is obtained in each step of the comprehensive processing method, the product is preferably recycled to achieve continuous processing of the noble lead.

In the aforementioned specific embodiments of the present invention, the purity and chemical composition of each component are tested as follows: The antimony white powder is tested according to the requirements of GB/T 4062-2013, and Sb and $Sb_2O_3$ are analyzed chemically by adopting the provisions of GB/T 3253.8-2009; the refined lead is subjected to chemical component analysis according to the requirements of GB/T 469-2013, and the impurities contained in the lead are analyzed chemically by adopting the provisions of GB/T 4103-2012; and the electrolyzed silver is subjected to chemical component analysis according to the requirements of GB/T 4135-2016, and the impurities contained in the silver are analyzed chemically by adopting the provisions of GB/T 11067.1-2006.

In the present invention, when the noble lead is subjected to comprehensive processing, there is an unavoidable loss in each step. Taking the vacuum distillation step as an example, the volatile matter is condensed onto a crucible wall, a furnace wall or a furnace lid, and thus a loss is generated since the volatile matter does not enter the condensing tray. Similarly, there is also an unavoidable error in the chemical component analysis of the products obtained in each step due to the uneven sampling. When the sum of the mass percentages of the components of a certain product is less than 100%, the impurities in the product are not detected, and when the sum of the mass percentages of the components is higher than 100%, it may be caused by a detection error.

In order to further illustrate the present invention, the method for comprehensively processing the noble lead as provided by the present invention will be described in detail below with reference to the accompanying drawing and embodiments, but they are not to be construed as limiting the claimed scope of the present invention.

The noble lead is processed according to the schematic flow diagram shown in the sole FIGURE. In the FIGURE, the electrolyzed lead refers to the electrolytic lead, the electrolyzed silver refers to the electrolytic silver, and the antimony white powder refers to antimony trioxide. The content of each component is a mass percentage, unless otherwise specified.

Embodiment 1

2,000 kg of the noble-lead material (35.14% of Pb, 14.38% of Sb, 17.21% of As, 7.60% of Bi, 7.54% of Cu, 14.93% of Ag, 18.11 g/t of Au, and the balance of undetected impurities, hereinafter was the same, and would not be described one by one any more) was placed into a stationary vacuum distillation furnace and covered with a vacuum furnace lid for sealing the vacuum furnace; vacuum-pumped to 30 Pa by a vacuum pump; heated to 800° C. after the pressure in the furnace is stable and subjected to the first stationary vacuum distillation treatment for a distillation time of 4 hours. The distillation volatile matters were condensed and collected by a two-stage condensation manner using a first-stage tray of 300-500° C. and a second-stage tray of 25-250° C., where 920.2 kg of a lead-bismuth-antimony alloy (about 0.0154% (154 g/t) of Ag, 0.03% of Cu, 6.54% of Sb, 92.09% of Pb+Bi, and 0.91% of As) was obtained in the first-stage tray, and 349 kg of elemental arsenic (95.99% of As, 3.63% of Pb+Bi+Sb, 0.02% of Cu, and 0.0005% of Ag) was obtained in the second-stage tray; and the residue in the crucible was 692.2 kg (0.009% of Pb+Bi, 32.8% of Sb, 0.07% of As, 21.7% of Cu, and 43.12% of Ag).

The lead-bismuth-antimony alloy obtained from the first stationary vacuum distillation was first put into a converter for oxidation refining, and the specific blowing parameters were: the blowing-in air flow of 5-20 $Nm^3$/min, the pressure of 150-300 kPa, the temperature of 1,000° C., and the time of 12 hours. 72.15 kg of antimony white powder was collected and 850 kg of lead-bismuth alloy (82.11% of Pb, 17.86% of Bi, and 165.8 g/t of Ag) was obtained; the lead-bismuth alloy was cast into an anode plate and then subjected to lead electrorefining under the following electrolyzation parameters: a current density of 180-200 A/$m^2$, a silicofluoric acid electrolyte of 120-200 g/L, an electrolysis temperature of 40-55° C., an electrolysis voltage of 0.3-0.6 V, an electrolyte circulation speed of 20-30 L/min, and an electrolyzation time of 24-48 hours, and 655 kg (Pb≤4N) of refined lead and bismuth anode mud were recycled after the electrolyzation; the bismuth anode mud was subjected to reduction smelting by using anthracite as a reducing agent at a dose accounting for 0.5-5% of the mass of the bismuth anode mud, so as to obtain 221 kg of noble bismuth (78% of Bi, 19% of Pb, and 1.8% of Ag); the noble bismuth is subjected to stationary vacuum distillation at a distillation temperature of 900° C. for a distillation time of 3 hours, so as to obtain 0.14 kg of the residue silver and 192 kg of the volatile matter raw bismuth (78.1097% of Bi, 21.87% of Pb, and 13 g/t of Ag); and the raw bismuth was subjected to chlorination refining at a temperature of 350-500° C. under the introduced chlorine at a pressure of 0.31-0.5 kPa for 5-6 hours, so as to obtain 150.00 kg of refined bismuth (Bi>4N).

The residue obtained from the first stationary vacuum distillation was subjected to a second vacuum distillation process, where the distillation temperature was 1,100° C., and the distillation time was 4 hours; and the pressure for the second vacuum distillation was 30 Pa. After the second distillation, 505.41 kg of a volatile matter silver alloy (58.88% of Ag, 40.0% of Sb, 0.19% of Cu, 0.17% of As, and 0.03% of Pb+Bi) and 175.90 kg of a secondary residue copper alloy (85.22% of Cu, 14.20% of Sb, 0.415% of Ag, 193.3 g/t of Au, and 0.09% of As) were obtained, respectively.

The volatile matter silver alloy obtained from the second stationary vacuum distillation was put into the converter and subjected to blowing treatment by top-blowing air, where the blowing-in air flow was 5-20 Nm$^3$/min, the pressure was 150-300 kPa, the temperature was 1,000° C., the time was 8 hours; and 233.67 kg of antimony white powder and 302.09 kg of the dore silver (98.34% of Ag, 0.0012% of Sb, 0.31% of Cu, and 0.15% of Pb+Bi) were obtained.

The dore silver was cast into an anode plate and placed in a silver electrolytic bath for silver electrorefining, where the process parameters were that: the temperature was 30-50° C., the electrolyte was 0.05-0.2 mol/L of a nitric acid solution, the current density across the cathode and anode was 300 A/m$^2$, the electrolysis time was 48 hours, the electrode distance was 100 mm, and the cell voltage was 1.8-2.5 V, and 297.1 kg of an electrolyzed silver product (Ag≤4N) and silver anode mud were obtained; and the secondary residue copper alloy was put into a converter and subjected to blowing treatment, where the blowing-in air flow was 5-20 Nm$^3$/min, the pressure was 150-300 kPa, the temperature was 1000° C., and the time was 6 hours; 28.84 kg of antimony white powder and 152 kg of the blister copper (98.29% of Cu, 0.0001% of Sb, 0.51% of Ag, 0.51% of Pb+Bi, 0.05% of As, and 223.68 g/t of Au) were obtained.

The blister copper was cast into an anode plate and placed in a copper electrolytic bath for copper electrorefining, where the process parameters were that: the temperature was 58-65° C., the electrolyte was 150-240 g/L of sulfuric acid and 45-48 g/L of a copper sulfate solution, the current density across the cathode and the anode was 220-300 A/m$^2$, the electrode distance was 5-110 mm, and the cell voltage was 0.2-0.4 V, and 149 kg of an electrolyzed copper product (Cu≤4N) and 1.1 kg of copper anode mud (the copper anode mud included the forms of elemental copper and copper sulfate, and the main components were 8.1% of Cu and 91.1% of Ag) were obtained after 1-6 hours of electrolyzation.

The anode mud obtained from the electrorefining of the blister copper was subjected to copper-removal acid leaching (using concentrated sulfuric acid at a mass concentration of 80 g/L) treatment, to obtain a copper sulphate solution and silver anode mud. The silver anode mud was subjected to silver electrorefining, where during the refining the temperature was 30-50° C., the electrolyte was the nitric acid solution at the concentration of 0.05-0.2 mol/L, the current density across the cathode and the anode was 280-320 A/m$^2$, the electrolysis time was 48 hours, the electrode distance was 100 mm, and the cell voltage was 1.8-2.5 V, 1.0 kg of an electrolyzed silver product (Ag≤4N) and silver anode mud were obtained respectively, and gold was obtained from the silver anode mud through a gold extraction process.

Embodiment 2

The noble-lead alloy was processed according to the method of Embodiment 1. 2,000 kg of the noble-lead material (including the same components as those in Embodiment 1) was placed into a stationary vacuum distillation furnace and covered with a vacuum furnace lid for sealing the vacuum furnace; vacuum-pumped to 70 Pa by a vacuum pump; heated to 900° C. after the pressure in the furnace is stable, and subjected to the first stationary vacuum distillation treatment for a distillation time of 4 hours. The distillation volatile matters were condensed and collected by a two-stage condensation manner, where 925.03 kg of a lead-bismuth-antimony alloy (203 g/t of Ag, 0.023% of Cu, 7.85% of Sb, 91.09% of Pb+Bi, and 0.83% of As) was obtained in the first-stage tray, and 350 kg of elemental arsenic (95.7% of As, 3.55% of Pb+Bi+Sb, 0.02% of Cu, and 0.0005% of Ag) was obtained in the second-stage tray; and the residue in the crucible was 696.2 kg (0.09% of Pb+Bi, 30.10% of Sb, 0.06% of As, 21.63% of Cu, and 42.69% of Ag).

The lead-bismuth-antimony alloy obtained from the first stationary vacuum distillation was first put into a converter for blowing treatment, and 86.9 kg of antimony white powder was collected and 850.2 kg of a lead-bismuth alloy (82.23% of Pb, 17.64% of Bi, and 219 g/t of Ag) was obtained; the lead-bismuth alloy was cast into an anode plate and then subjected to lead electrorefining to recycle the lead, and 666.7 kg of refined lead (Pb≤4N) and bismuth anode mud were obtained; the bismuth anode mud was subjected to reduction smelting to obtain 182.45 kg of noble bismuth (80.67% of Bi, 16.03% of Pb, and 1.809% of Ag); the noble bismuth is subjected to stationary vacuum distillation at a distillation temperature of 900° C. for a distillation time of 3 hours, so as to obtain 0.18 kg of the residue silver and 192 kg of the volatile matter raw bismuth (77.6% of Bi, 22.26% of Pb, and 6 g/t of Ag); and the raw bismuth was subjected to chlorination refining to obtain 149 kg of refined bismuth (Bi>4N).

The residue obtained from the first stationary vacuum distillation was subjected to a second vacuum distillation process, where the distillation temperature was 1,150° C., and the distillation time was 4 hours; and the pressure for the second vacuum distillation was 50 Pa. After the second distillation, 482.43 kg of a volatile matter silver alloy (61.41% of Ag, 38.26% of Sb, 0.23% of Cu, 0.07% of As, and 0.021% of Pb+Bi) and 175.8 kg of a secondary residue copper alloy (85% of Cu, 14.3% of Sb, 0.51% of Ag, 186 g/t of Au, and 0.07% of As) were obtained, respectively.

The volatile matter silver alloy obtained from the second stationary vacuum distillation was put into the converter and subjected to blowing treatment by top-blowing air, and 220 kg of antimony white powder and 297.14 kg of the dore silver (99.6% of Ag, 0.07% of Sb, 0.2% of Cu, and 0.1% of Pb+Bi) were obtained.

The dore silver was cast into an anode plate and placed in a silver electrolytic bath for silver electrorefining, where the process parameters were that: the temperature was 30-50° C., the electrolyte was 0.05-0.2 mol/L of a nitric acid solution, the current density across the cathode and anode was 300 A/m$^2$, the electrolysis time was 24 hours, the electrode distance was 50 mm, and the cell voltage was 1.8-2.5 V, and 296 kg (Ag≤4N) of an electrolyzed silver product and silver anode mud were obtained; then the secondary residue copper alloy was put into a converter for blowing treatment, where the blowing-in air flow was 5-20 Nm³/min, the pressure was 150-300 kPa, the temperature was 1000° C., and the time was 6-24 hours; 30 kg of antimony white powder and 151.54 kg of the blister copper (98.7% of Cu, 0.010% of Sb, 1.1% of Ag, 0.18% of Pb+Bi, 0.04% of As, and 0.01% of Au) were obtained; and then the blister copper was cast into an anode plate and placed in a copper electrolytic bath for copper electrorefining, and 149 kg of an electrolyzed copper product (Cu≤4N) and 2.12 kg of copper anode mud were obtained. The anode mud obtained from the electrorefining of the blister copper was subjected to copper-removal acid leaching treatment, to obtain a copper sulphate solution and silver anode mud. The silver anode mud was subjected to silver electrorefining, and 1.67 kg of an electrolyzed silver product and silver anode mud were obtained respectively, and gold was obtained from the silver anode mud through a gold extraction process.

Embodiment 3

The noble-lead alloy was processed according to the method of Embodiment 1. 2,000 kg of the noble-lead material (including the same components as those in Embodiment 1) was placed into a stationary vacuum distillation furnace and covered with a vacuum furnace lid for sealing the vacuum furnace; vacuum-pumped to 50 Pa by a vacuum pump; heated to 850° C. after the pressure in the furnace is stable, and subjected to the first stationary vacuum distillation treatment for a distillation time of 4 hours. The distillation volatile matters were condensed and collected by a two-stage condensation manner, where 931.04 kg of a lead-bismuth-antimony alloy (0.21% of Cu, 8% of Sb, 91.19% of Pb+Bi, 0.86% of As, and 200 g/t of Ag) was obtained in the first-stage tray, and 348.65 kg of elemental arsenic (96.27% of As, 3.15% of Pb+Bi+Sb, 0.03% of Cu, and 0.0005% of Ag) was obtained in the second-stage tray; and the residue in the crucible was 697.3 kg (0.08% of Pb+Bi, 33.7% of Sb, 0.05% of As, 21.48% of Cu, and 42.73% of Ag).

The lead-bismuth-antimony alloy obtained from the first stationary vacuum distillation was first put into a converter for blowing treatment under the blowing conditions which were the same as those of Embodiment 1 for a time period of 15 h, and 85 kg of antimony white powder was collected and 849 kg of a lead-bismuth alloy (82.3% of Pb, 17.66% of Bi, and 210 g/t of Ag) was obtained; the lead-bismuth alloy was cast into an anode plate and then subjected to lead electrorefining to recycle the lead, and 665.03 kg of refined lead (Pb≤4N) and bismuth anode mud were obtained; the bismuth anode mud was subjected to reduction smelting to obtain 183.95 kg of noble bismuth (81.4% of Bi, 18.47% of Pb, and 0.1% of Ag); the noble bismuth is subjected to stationary vacuum distillation at a distillation temperature of 900° C. for a distillation time of 3 hours, so as to obtain 0.18 kg of the residue silver and 185.67 kg of the volatile matter raw bismuth (80.6% of Bi, 18.3% of Pb, and 7 g/t of Ag); and the raw bismuth was subjected to chlorination refining to obtain 149.6 kg of refined bismuth (Bi>4N).

The residue obtained from the first stationary vacuum distillation was subjected to a second vacuum distillation process, where the distillation temperature was 1,100° C., and the distillation time was 4 hours; and the pressure for the second vacuum distillation was 45 Pa. After the second distillation, 510 kg of a volatile matter silver alloy (58.23% of Ag, 41.12% of Sb, 0.21% of Cu, 0.07% of As, and 0.025% of Pb+Bi) and 181.2 kg of a secondary residue copper alloy (82.03% of Cu, 14.05% of Sb, 0.3% of Ag, 180 g/t of Au, and 0.05% of As) were obtained, respectively.

The volatile matter silver alloy obtained from the second stationary vacuum distillation was put into the converter and subjected to blowing treatment by top-blowing air for a blowing time of 6 hours, and 251 kg of antimony white powder and 252.07 kg of the dore silver (99.5% of Ag, 0.067% of Sb, 0.2% of Cu, and 0.1% of Pb+Bi) were obtained.

The dore silver was cast into an anode plate and placed in a silver electrolytic bath for silver electrorefining, where the process parameters were that: the temperature was 30-50° C., the electrolyte was 0.05-0.2 mol/L of a nitric acid solution, the current density across the cathode and anode was 300 A/m², the electrolysis time was 40 hours, the electrode distance was 75 mm, and the cell voltage was 1.8-2.5 V, and 290 kg (Ag≤4N) of an electrolyzed silver product and silver anode mud were obtained; then the secondary residue copper alloy was put into a converter and subjected to blowing treatment, where the blowing-in air flow was 5-20 Nm³/min, the pressure was 150-300 kPa, the temperature was 1000° C., and the time was 10 hours; 30.5 kg of antimony white powder and 150.54 kg of the blister copper (98.06% of Cu, 0.01% of Sb, 0.358% of Ag, 0.18% of Pb+Bi, 0.05% of As, and 212 g/t of Au) were obtained.

Then the blister copper was cast into an anode plate and placed in a copper electrolytic bath for copper electrorefining, and 148 kg of an electrolyzed copper product (Cu≤4N) and 2.03 kg of copper anode mud were obtained. The anode mud obtained from the electrorefining of the blister copper was subjected to copper-removal acid leaching treatment, to obtain a copper sulphate solution and silver anode mud. The silver anode mud was subjected to silver electrorefining, and 1.83 kg of an electrolyzed silver product and silver anode mud were obtained respectively, and gold was obtained from the silver anode mud through a gold extraction process.

It can be seen from the aforementioned embodiments that, the present invention uses a stationary vacuum distillation technique for the treatment of noble lead, which enables efficient separation of base metals and enrichment of precious metals from the noble lead alloy. Various products (such as Pb, Bi, Ag, Au, Cu, etc.) are returned to the main smelting process in the form of raw materials, which greatly improves the direct yield of each valuable metal, and antimony can be directly converted into a standard new product of industrial antimony white powder by oxidation refining. One important aspect is that the arsenic in the noble lead can form an open circuit in an elemental form by conducting stationary distillation for once, which successfully realizes the harmless and resourceful treatment of arsenic. The alloy product obtained through the stationary distillation of the noble-lead raw material is subjected to simple processes such as oxidation refining (blowing), electrorefining, chlorination refining, etc., and then can be comprehensively recycled to obtain the final product. The entire treatment process realizes the efficient separation and recycle of valuable metals such as arsenic, antimony, lead, bismuth, antimony, silver, copper, gold, etc. and continuous production can be realized, which reduces the pressure on the environment as compared with the existing pyrometallurgical process and hydrometallurgical process.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

The embodiments described above are only descriptions of preferred embodiments of the present invention and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

What is claimed is:

1. A method for comprehensively processing a noble lead, comprising:
   (1) subjecting the noble lead to a first vacuum distillation to obtain a volatile matter and a residue, wherein constituent elements of the noble lead comprise lead, antimony, arsenic, bismuth, copper, silver and gold, subjecting the volatile matter to two-stage condensation to obtain a lead-bismuth-antimony alloy and elemental arsenic respectively;
   subjecting the lead-bismuth-antimony alloy to oxidation refining to obtain antimony trioxide and a lead-bismuth alloy; then electrolyzing the lead-bismuth alloy to obtain refined lead and bismuth anode mud; then sequentially subjecting the bismuth anode mud to reduction smelting and vacuum distillation to obtain silver and raw bismuth; and finally subjecting the raw bismuth to chlorination refining to obtain refined bismuth and lead chloride;
   (2) subjecting the residue obtained in step (1) to a second vacuum distillation to obtain a silver alloy and a copper alloy;
   subjecting the silver alloy to oxidation refining to obtain antimony trioxide and dore silver; and then subjecting the dore silver to electrorefining to obtain electrolytic silver and silver anode mud; and
   (3) subjecting the copper alloy to oxidation refining to obtain antimony trioxide and blister copper, then subjecting the blister copper to electrorefining to obtain electrolytic copper and copper anode mud; then subjecting the copper anode mud to acid leaching to obtain a copper salt and a gold-rich silver slag; finally subjecting the gold-rich silver slag to electrorefining to obtain electrolytic silver and silver anode mud; and returning the copper salt to the electrorefining;
   wherein in step (1) a mass content of the constituent elements of the noble lead is: 20-40% of Pb, 10-20% of Sb, 15%-40% of As, 5-10% of Bi, 5-10% of Cu, 10-15% of Ag, and 5-1500 g/t of Au;
   wherein for the first vacuum distillation of step (1), a temperature is 750-950° C., a time is 3-5 hours, and a pressure is 1-100 Pa;
   wherein for the chlorination refining in step (1), a temperature is 350-500° C., and a time is 5-6 hours; and during the chlorination refining, a pressure of the chlorine is 0.31-0.5 kPa;
   wherein for the second vacuum distillation of step (2), a temperature is 1,100-1,500° C., a time is 2-4 hours, and a pressure is 1-100 Pa.

2. The method of claim 1, wherein the two-stage condensation of step (1) comprises first-stage condensation and second-stage condensation, a temperature for the first-stage condensation is 300-500° C.; and a temperature for the second-stage condensation is 25-250° C.

3. The method of claim 1, wherein for the oxidation refining of step (1), a temperature is 800-1200° C., a time is 6-24 hours, an oxidation atmosphere is air, an air flow is 5-20 Nm$^3$/min, and a pressure is 150-300 kPa.

4. The method of claim 1, wherein in step (1), during the electrolyzation of the lead-bismuth alloy, a current density is 180-200 A/m$^2$, a voltage is 0.3-0.6 V, a time is 24-48 hours, a temperature is 40-55° C., and an electrolyte circulation speed is 20-30 L/min.

5. The method of claim 1, wherein in step (1), during the reduction smelting and vacuum distillation of the bismuth anode mud, a reducing agent for the reduction smelting is anthracite, and a mass of the reducing agent is 0.5-5% by mass of the bismuth anode mud; and for the vacuum distillation, a temperature is 800-1050° C., a time is 2.5-3.5 hours, and a pressure is 1-100 Pa.

6. The method of claim 1, further comprising conducting gold extraction treatment on the silver anode mud obtained from step (2) and the silver anode mud obtained from step (3).

* * * * *

UNITED STATES PATENT AND TRADEMARK OFFICE
CERTIFICATE OF CORRECTION

PATENT NO. : 10,982,299 B2
APPLICATION NO. : 16/357369
DATED : April 20, 2021
INVENTOR(S) : Bin Yang et al.

It is certified that error appears in the above-identified patent and that said Letters Patent is hereby corrected as shown below:

In the Specification

Column 3, Line 36, reads "per, refined lead and refined bismuth each has a purity ≤ 4N" and should read -- per, refined lead and refined bismuth each has a purity ≥ 4N --.

Column 5, Line 49, reads "white powder is ≤ 99%" and should read -- white powder is ≥ 99% --.

Column 6, Line 44, reads "In the present invention, the purity of the silver is ≤ 4N" and should read -- In the present invention, the purity of the silver is ≥ 4N --.

Column 6, Line 62, reads "≤ 4N" and should read -- ≥ 4N --.

Column 7, Line 38, reads "trioxide in the antimony white powder is preferably ≤ 99%" and should read -- trioxide in the antimony white powder is preferably ≥ 99% --.

Column 7, Line 60, reads "silver is preferably ≤ 4N, and thus the electrolytic silver can" and should read -- silver is preferably ≥ 4N, and thus the electrolytic silver can --.

Column 8, Line 20, reads "trioxide in the antimony white powder is ≤ 99%" and should read -- trioxide in the antimony white powder is ≥ 99% --.

Column 8, Line 48, reads "purity preferably ≤ 4N, and thus can be directly recycled to" and should read -- purity preferably ≥ 4N, and thus can be directly recycled to --.

Column 9, Line 18, reads "from the electrolyzation has a purity ≤ 4N, and thus can be" and should read -- from the electrolyzation has a purity ≥ 4N, and thus can be --.

Column 10, Line 57, reads "(Pb≤4N) of refined lead and bismuth anode mud were" and should read -- (Pb≥4N) of refined lead and bismuth anode mud were --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,982,299 B2

Column 11, Line 32, reads "(Ag≤4N) and silver anode mud were obtained; and the" and should read -- (Ag≥4N) and silver anode mud were obtained; and the --.

Column 11, Line 48, reads "(Cu≤4N) and 1.1 kg of copper anode mud (the copper anode" and should read -- (Cu≥4N) and 1.1 kg of copper anode mud (the copper anode --.

Column 11, Line 64, reads "an electrolyzed silver product (Ag≤4N) and silver anode" and should read -- an electrolyzed silver product (Ag≥4N) and silver anode --.

Column 12, Line 32, reads "and 666.7 kg of refined lead (Pb≤4N) and bismuth anode" and should read -- and 666.7 kg of refined lead (Pb≥4N) and bismuth anode --.

Column 12, Line 66, reads "1.8-2.5 V, and 296 kg (Ag≤4N) of an electrolyzed silver" and should read -- 1.8-2.5 V, and 296 kg (Ag≥4N) of an electrolyzed silver --.

Column 13, Line 10, reads "kg of an electrolyzed copper product (Cu≤4N) and 2.12 kg" and should read -- 1 kg of an electrolyzed copper product (Cu≥4N) and 2.12 kg --.

Column 13, Line 50, reads "lead (Pb≤4N) and bismuth anode mud were obtained; the" and should read -- lead (Pb≥4N) and bismuth anode mud were obtained; the --.

Column 14, Line 17, reads "1.8-2.5 V, and 290 kg (Ag≤4N) of an electrolyzed silver" and should read -- 1.8-2.5 V, and 290 kg (Ag ≥4N) of an electrolyzed silver --.

Column 14, Line 28, reads "ing, and 148 kg of an electrolyzed copper product (Cu≤4N)" and should read -- ing, and 148 kg of an electrolyzed copper product (Cu≥4N) --.